Nov. 21, 1950     J. R. THOMAS     2,531,014
VARIABLE SPEED HYDRAULIC CLUTCH Filed Nov. 16, 1948     5 Sheets-Sheet 1

Fig. 1.

Inventor
John R. Thomas
BY
Frank J. Schraeder Jr.
Attorney.

Nov. 21, 1950 J. R. THOMAS 2,531,014
VARIABLE SPEED HYDRAULIC CLUTCH
Filed Nov. 16, 1948 5 Sheets-Sheet 5

Inventor
John R. Thomas
By Frank J. Schraeder Jr.
Attorney

Patented Nov. 21, 1950

2,531,014

UNITED STATES PATENT OFFICE 2,531,014

VARIABLE SPEED HYDRAULIC CLUTCH

John R. Thomas, Wichita, Kans., assignor to Thomas Hydraulic Speed Controls, Inc., Wichita, Kans., a corporation of Kansas Application November 16, 1948, Serial No. 60,270

6 Claims. (Cl. 192—61)

This invention relates to improvements in variable speed hydraulic clutches of the type shown in my copending patent application Serial No. 717,915 filed December 23, 1946, wherein two fluids of different resistant value are employed independently as well as in mixtures of relatively varied proportions and wherein the control of the independent fluids and of their mixtures is effected through movable valve means adapted for metering and arresting the flow of the fluids passing through a fluid-circulating and power-transmitting instrumentality such as, for example, a gear type pump having elements operatively connecting the clutch casing with a driven shaft extending into the clutch casing.

The present invention has among its objects to provide certain improved structural and operative features not disclosed in prior art which materially enhance the stability and utility of hydraulic clutches of the aforementioned type, increase the efficiency thereof and enhance the scope of adaptation of same to diverse power transmission operations in a wide field of uses.

Another object of the invention is found in the provision of a symmetrically constructed clutch including fluid-circulating and power-transmitting means located centrally axially of the clutch casing to thereby provide a dynamically balanced rotatable body affording an appreciable reduction in cost of manufacture through symmetry in design whereby the oppositely disposed intake and discharge manifolds of a power-transmitting fluid pump may be constructed alike and whereby the clutch casing may consist of a pair of like castings disposed on and secured to opposite ends of the power-transmitting fluid pump.

Still another object of the invention resides in the provision of fluid-circulating passages extending transversely through the fluid pump for affording circulation of the fluid between the fluid chambers within opposite ends of the clutch casing thereby providing a more uniform distribution and more efficient dissipation of the heat generated within the pump.

A further object of the invention is found in the provision of an axially symmetrically constructed clutch including a fluid-circulating and power-transmitting pump disposed centrally axially of the clutch casing and having fluid intake and discharge ports communicating with fluid chambers disposed within the casing at opposite ends of the pump including axially aligned dual valve means disposed within the fluid chambers for metering and controlling fluid flow through said ports at the intake and discharge openings thereof within manifolds disposed on opposite ends of the pump and conjoint control means adapted for controlling the operation of the dual valve means during the rotation of the clutch casing.

Still another object of the invention resides in the provision of a hydraulic clutch adapted to be interposed between power-driven means and a driven shaft and embodying a rotatable casing partiallly filled with oil whereby, during the rotation of the casing, there is provided within the casing an outer annular zone of oil and an inner central zone of air, including a power-transmitting pump provided with fluid intake ports having inlet openings on one end of the pump and discharge ports having discharge openings on the opposite end of the pump, the pump having elements operatively connected with the casing and with the driven shaft and being disposed centrally axially of and within the casing thereby dividing the interior of the casing into two axially spaced intercommunicating chambers and each chamber containing a valve for controlling the metering and circulation of fluid through the pump from one chamber to the other, one of the valves controlling the flow of fluid through the inlet openings into the intake ports and the other valve controlling the flow of fluid through the discharge openings of the discharge ports, the valves being disposed within both of said zones and movable by conjoint control means within both of said zones to control the flow of air, or of mixtures of air and oil, or of oil, or of neither, through the pump to thereby control the stationary position or relatively variable rotations of the driven shaft during the rotation of the casing by the power-driven means.

The various features of novelty whereby the present invention is characterized will hereinafter be pointed out with particularity in the appended claims; but, for a full understanding of the invention and of its various objects and advantages, reference may be had to the following detailed description taken in connection with the accompanying drawings exemplifying a preferred embodiment of the invention which is now considered to be the best mode of applying the novel principles of the invention.

The illustrations in the drawings, in which like reference characters designate like or corresponding parts, may be described as follows.

In the preferred exemplification of my invention as illustrated in the accompanying drawings, the clutch casing, generally designated by numeral 20, comprises a pair of like cup-shaped sections 20$^A$ and 20$^B$, preferably of cast metal, each consisting of an arcuate wall portion 21 provided at its inner end with an integral cylindrical wall portion 22 and, at its outer periphery, with an integral connection flange 23. For heat dissipating purposes, the outer face of each wall portion 21 is preferably provided with radially disposed circumferentially spaced ribs 24 which conform to the contour of the wall portion 21 and extend, as reenforcing ribs, from the wall portion 22 to the connection flange 23.

The power-driven drive shaft 25 is provided with an enlarged head 26 which is supported within the cylindrical wall 22 and by means of its flange 26$^A$ and screws 27 is rigidly secured to the casing section 20$^B$.

The oppositely disposed companion casing section 20$^A$ is shown provided with a flanged hub 28 mounted within its cylindrical wall 22 and secured thereto by screws 29.

The hub 28 carries an oil seal 30 and a ball bearing 31 in which is rotatably mounted the driven shaft 32 the inner end of which is diametrically decreased and rotatably supported on a suitable bearing 33 securely mounted within a suitable cavity formed within the inner face of the head 26 of the drive shaft 25.

The centrally axially disposed fluid-circulating and power-transmitting instrumentality is illustrated as a gear type fluid pump having a circularly shaped body 34.

The peripheral flanges 23 of the casing sections 20$^A$ and 20$^B$ are rigidly secured to the peripheral rim portion of the pump body 34 which is thus centrally axially supported within the casing 20.

Figure 1:
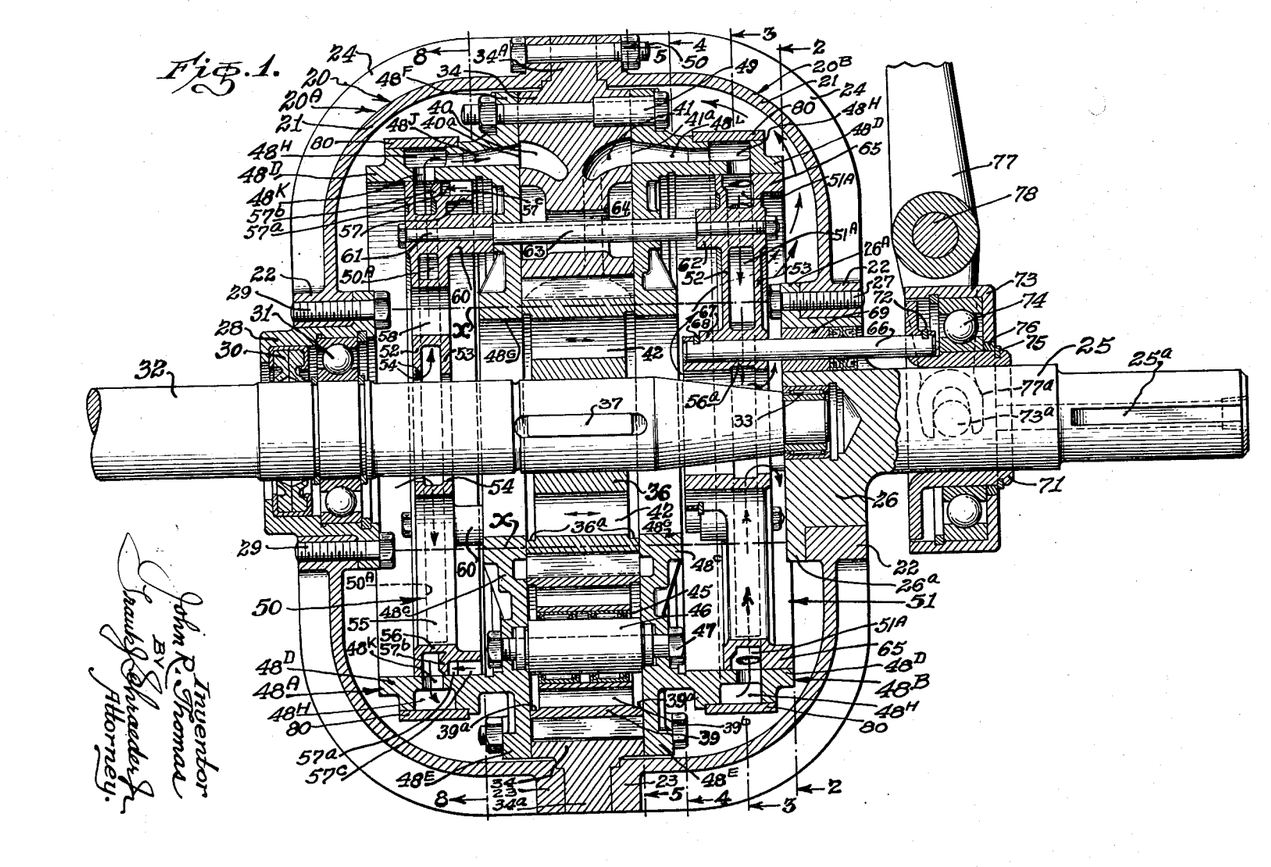
Fig. 1 illustrates a longitudinal section through a hydraulic clutch embodying my invention; the fluid-circulating and power-transmitting pump and the dual fluid metering means are shown in longitudinal section taken on line A—A of Fig. 5.
Figure 2:
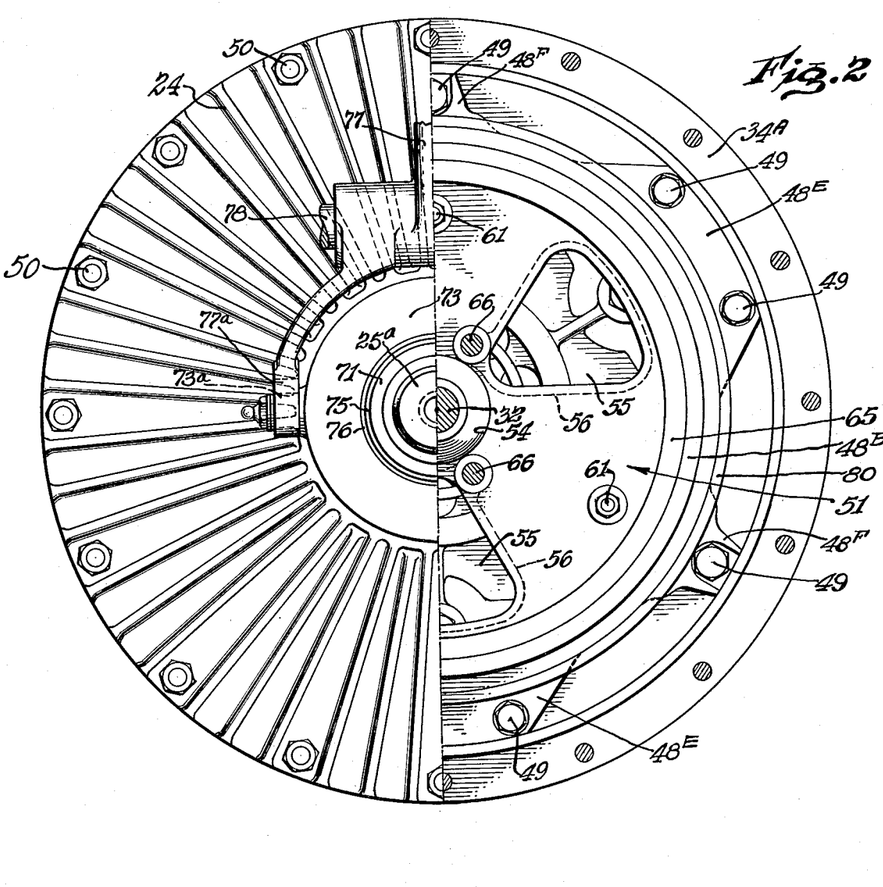
Fig. 2 illustrates a one-half end view of the clutch as viewed from the right-hand side of the clutch shown in Fig. 1; the illustration of the portion shown on the right-hand side of Fig. 2 is a one-half face view of one of the valves taken on line 2—2 of Fig. 1 showing also the outer side portions of one of the manifolds and the pump body but with the clutch casing omitted from the illustration.
Figure 5:
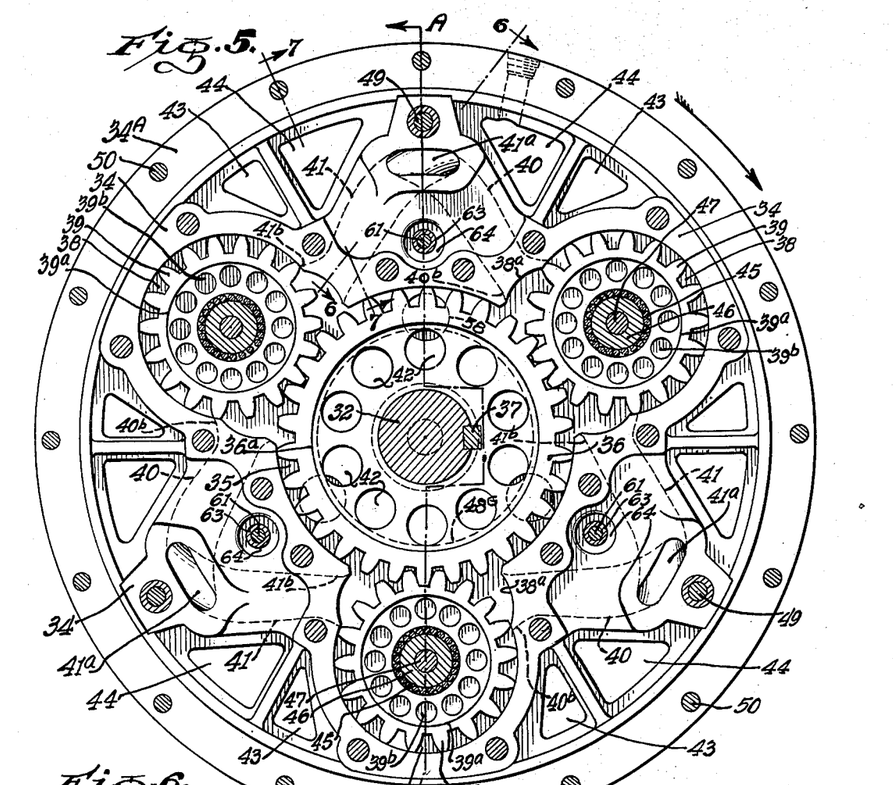
Fig. 5 is a cross-section taken on line 5—5 of Fig. 1; the clutch casing being omitted.

As more clearly shown in Figs. 1 and 5, the pump body 34 is circular in shape and has a central bore 35 containing a sun gear 36 which is secured by key 37 to the driven shaft 32. As shown in Fig. 5, the bore 35 is provided with three arcuate openings in its periphery which communicate with three circularly equally spaced bores 38 each containing a planet gear 39 in mesh with the sun gear 36. Assuming that the rotation of the clutch is clockwise as indicated by the arrow in Fig. 5, between each pair of planet gears 39, the pump body 34 is provided with a fluid intake port 40 and a fluid discharge port 41.

The sun gear bore or cavity 35 and planet gear bores or cavities 38 extend transversely through the opposed parallel end faces of the pump body 34. The corresponding end portions of the arcuate walls which define the planet gear cavities 38 are slightly recessed, as at 38$^a$, to provide thereat slightly enlarged cavities which communicate with the inner ends of the intake and discharge ports whereat such inner ends the intake and discharge ports are enlarged to extend substantially across the full thickness or width of the pump body as illustrated in Fig. 6.

In the three planet gear body shown in the drawings, the intake and discharge ports extend therein in the form of a triangularly shaped circuit, the series of inlet openings 40$^a$ for the intake ports 40 and the series of outlet openings 41$^a$ for the discharge ports 41 are located on opposite ends of the pump body and the inlet opening 40$^a$ of an intake port 40 for each planet gear cavity 38 is axially aligned with an outlet opening 41$^a$ of a discharge port 41 of an adjacent one of the planet gear cavities and such axially aligned intake and discharge openings are located midway between and communicate with opposite sides of cavities for two of the planet gears.

Figure 6:
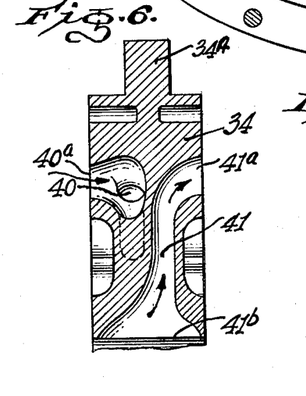
Figs. 6 and 7 are cross-sections taken respectively on lines 6—6 and 7—7 of Fig. 5.
Figure 7:
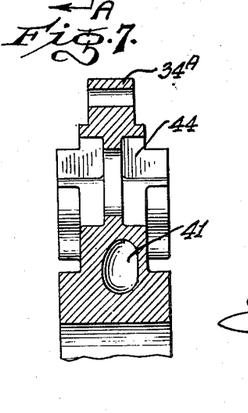

Each intake port 40 is provided with an inwardly flaring outlet opening 40$^b$ similar in configuration to the inlet opening 41$^b$ of a discharge port 41 shown in Fig. 6.

To provide cross flow of the fluids between the chambers disposed at opposite ends of the pump transversely through the pump body 34, the sun gear 36 is provided with a plurality of transverse open passages 42 disposed within the air zone and, in addition, the pump body is provided with transverse open passages 43 and 44 disposed within the oil zone.

Each planet gear 39 is provided with a suitable antifriction bearing 45 for rotation on a tubular pin 46 which is securely held by a bolt 47 which extends longitudinally through the planet pin 46 and through the suction and discharge manifolds designated by respectively numerals 48$^A$ and 48$^B$. The planet pins 46 have diametrically decreased ends for support within recesses in the manifolds as more clearly shown in Fig. 1.

To improve the efficiency of the gear type pump, I slightly recess the opposite ends of the gears. The recesses are clearly shown in Figs. 1 and 5; the circular recesses in the planet gears 39 are designated by numeral 39$^a$ and those in the sun gear 36 by numeral 36$^a$. These circular recesses are preferably of a depth of about $\frac{1}{16}$ to $\frac{1}{8}$ of an inch and extend radially outwardly to within a predetermined distance from the root circle of the teeth and function to reduce the drag torque transmitted to the driven shaft 32. For lubrication purposes, the planet gears 39 are each preferably provided with a plurality of circularly equally spaced transverse passages 39$^b$.

The two like sections 20$^A$ and 20$^B$ of the casing 20 are securely bolted to the peripheral rim portion 34$^A$ of the pump body 34 by circularly equally spaced bolts 50.

In carrying out the symmetry of design, as in the similar casing sections 20$^A$ and 20$^B$, the two manifold plates 48$^A$ and 48$^B$ are identical as far as the castings constituting their bodies are concerned and each manifold plate consists of a transverse wall portion 48$^C$ having an axially extending integral cylindrical wall portion 48$^D$ disposed concentrically with the longitudinal axes of the drive shaft 25 and the driven shaft 32 and constituting a valve seat.

Each manifold is cast with a plurality of peripherally disposed circularly spaced lugs 48$^E$ and 48$^F$ formed integrally with and within the plane of the transverse wall portion 48$^C$ and extending radially outwardly beyond the transverse portion 48$^C$. The lugs 48$^E$ and 48$^F$ are provided with openings to receive bolts 49 whereby the two manifolds are secured to opposite sides of the pump body 34.

Each manifold is provided with a comparatively large central opening 48$^G$ which is concentric with the driven shaft 32. These manifold openings afford free passage of fluid between the fluid chambers on the opposite ends of the pump through the manifolds and through openings 43 and 44 in the pump body 34 and through the passages 42 of the sun gear 36.

Each manifold is cast with an annular pressure-stabilizing port 48$^H$ disposed within the peripheral face of the axially disposed wall or valve seat 48$^D$.

Circular pre-loaded closure rings 80 are applied upon the peripheral faces of walls 48$^D$ to enclose the pressure-stabilizing ports 48$^H$.

The pressure-stabilizing port 48$^H$ in the suction manifold 48$^A$ is provided with three circularly equally spaced elongated manifold intake ports 48$^J$ which register and communicate with the three inlet openings 40$^a$ of the three intake ports 40 within the pump body 34. The port 48$^H$ in the suction manifold 48$^A$ is also provided with a plurality of circularly equally spaced intake openings 48$^K$ within the cylindrical wall 48 which constitutes the valve seat for the suction valve 50 later to be described.

The pressure-stabilizing port 48$^H$ in the discharge manifold 48$^B$ is provided with three circularly equally spaced elongated manifold discharge ports 48$^L$ which register and communicate with the three outlet openings 41$^a$ of the three discharge ports 41 within the pump body 34.

Figure 3:
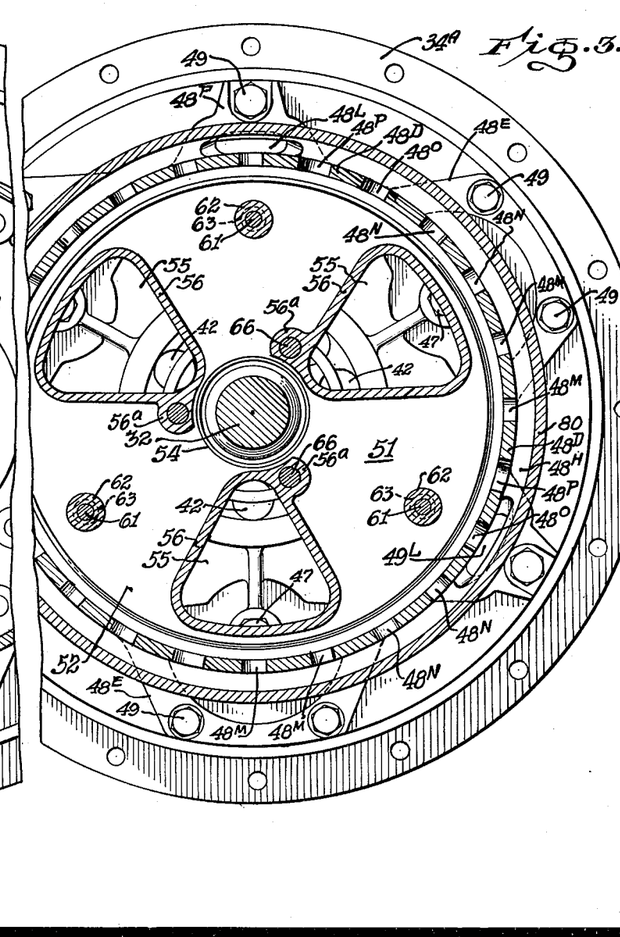
Figs. 3 and 4 are fragmentary cross-sections taken respectively on lines 3—3 and 4—4 of Fig. 1; the clutch casing being omitted.
Figure 4:
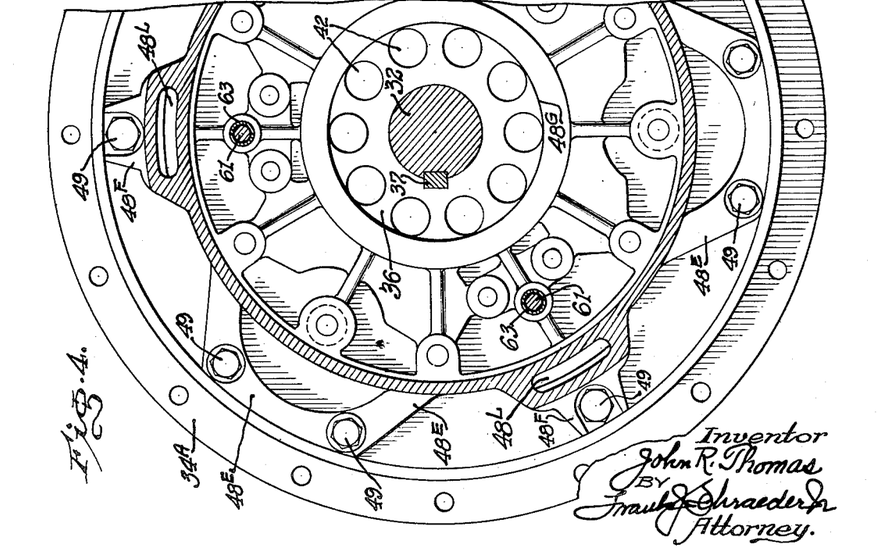

The port 48$^H$ in the discharge manifold 48$^B$ is also provided with a plurality of circularly equally spaced discharge openings within the cylindrical wall 48$^D$ which constitutes the valve seat for the discharge valve 51 later to be described. For most efficient clutch operation, these discharge openings are preferably circularly arranged in series each series comprising a plurality of discharge openings of at least two different diameters and all of the discharge openings of all series having edges circularly aligned in a common plane as, for example, with the plane of the face of the outer side wall of the pressure-stabilizing port 48$^H$ as indicated in Fig. 1. Each series may also consist of several individual openings each of different diameter and pairs of openings differing in diameters from the diameters of the individual openings as, for example, Fig. 3 shows each of the series of discharge openings as consisting of two small holes 48$^M$, 48$^M$, two slightly larger holes 48$^N$, 48$^N$; one still larger hole 48$^O$; and one largest hole 48$^P$. Thus each of the four series consisting of six openings.

The movable fluid control valve means comprises a pair of axially spaced valves of similar cylindrical unitary structure, namely, a fluid intake control or suction valve 50 and a fluid discharge control valve 51. Since these valves are similar, their similar structural elements are herein designated by like reference characters and each valve may be described as consisting of a pair of diametrically disposed axially spaced walls 52 and 53 of like diameter slidably mounted within the valve seats 48$^D$ of the suction and discharge manifolds, respectively designated by 48$^A$ and 48$^B$.

The walls 52 and 53 are provided with central openings 54 to permit free flow of fluid around the driven shaft 32 through the passages between the walls 52 and 53.

Each valve 50 and 51 is provided with preferably three large open fluid passages 55 extending axially of the valve transversely through the walls 52 and 53. The fluid passages 55 are preferably of substantially triangular shape and are defined by triangularly disposed enclosure walls 56 which extend transversely through the passages between the walls 52 and 53 and are formed integrally therewith to seal the three transverse passages 55 from communication with the three radially disposed passages between the walls 52 and 53.

Figure 9:
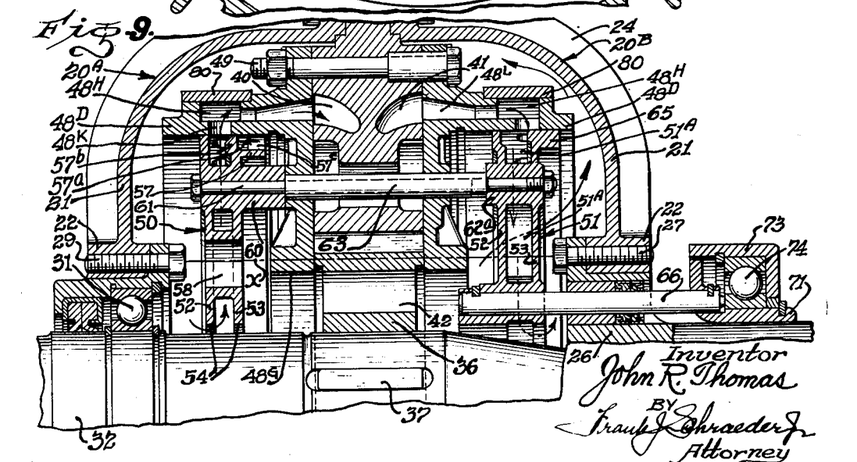
Fig. 9 is a fragmentary longitudinal section showing the dual valve means provided with modified connecting rods and illustrating the manner of phase adjustment of the control for the dual valve means.

Referring now particularly to the fluid intake or suction control valve 50 which controls the flow of air, mixtures of air and oil, or of only oil into the gear type power transmission pump, this valve 50 is cast with an inwardly axially disposed circular fluid flow control rim 57 which is provided with an annular oil inlet channel 57$^a$ disposed within the peripheral face of the rim 57 adjacent the circular fluid metering control rim portion 57$^b$ which is provided with a comparatively very narrow peripheral face in slidable engagement with the face of the valve seat 48$^D$ as clearly shown in Figs. 1 and 9.

During the rotation of the clutch casing, which is partially filled with oil, the oil will assume annulus form to provide a central core of air which for illustration is defined by the dot and dash lines designated by X.

Figure 8:
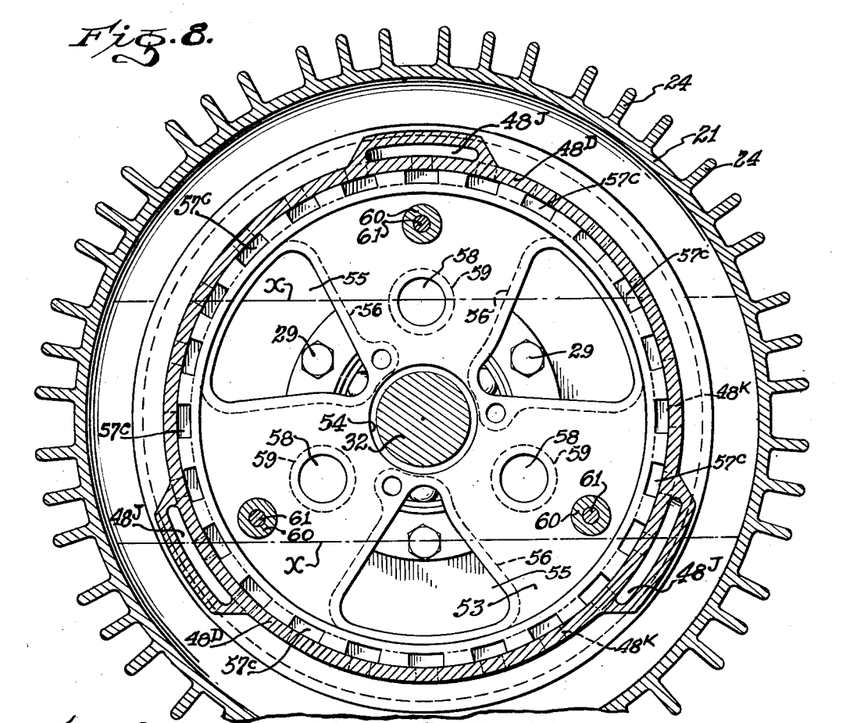
Fig. 8 is a cross-section taken on line 8—8 of Fig. 1.

The oil inlet channel 57$^a$, which during the rotation of the clutch is disposed within the oil annulus, has open communication with the oil annulus through the circularly spaced arcuate oil inlet openings 57$^c$ which consist of circularly spaced slots within the peripheral face of the rim 57 as more clearly shown in Figs. 1, 8 and 9.

The radially outwardly flaring passages 50$^A$ disposed between the axially spaced walls 52 and 53 of the fluid intake control valve 50 are radially defined by the walls 56 and constitute radially outwardly flaring open air intake passages for flow of air from the central zone of air admitted thereinto through the central valve openings 54 for discharge through their open outlets within the peripheral portion of the valve in to the valve seat intake openings 48$^K$ when the intake control valve 50 is positioned to communicate therewith as illustrated in Fig. 1.

The intake control valve 50 may also be provided with additional transverse fluid passages, to enhance the free flow of fluids between the opposite ends of the valve, in the form of circular passages 58 defined by the circular enclosure walls 59 which extend transversely through the radially outwardly flaring passages between the walls 52 and 53 and which walls 59 are formed integrally therewith to seal the passages 58 from communication with the radially outwardly flaring passages 50$^A$ between the walls 52 and 53.

As illustrated in Figs. 1 and 9, the valves 50 and 51 are arranged for concurrent operation and for this purpose the valve 50 is provided with three circularly equally spaced bosses 60 cast integrally with the walls 52 and 53 and extending through the air inlet passages 50ᴬ and protruding inwardly a predetermined distance to constitute limit stops for concurrent movement of both valves 50 and 51 when moved to the right as viewed in Figs. 1 and 9 into engagement with aligned bosses on the suction manifold 48ᴬ whereat valve 50 is properly positioned for neutral clutch operation with the air inlet passages 50ᴬ aligned with the suction manifold valve seat intake openings 48ᴷ.

The concurrent operation of valves 50 and 51 is attained by connection rods 61 which extend through the bosses 60 and through similar bosses 62 on valve 51; the valves 50 and 51 being accurately spaced apart a predetermined distance and so retained by means of spacers 63 in the form of sleeves mounted on the rods 61 and having their ends in abutment with the opposed ends of bosses 60 and 62.

The connection rods 61 and their spacer sleeves 63 extend through openings 64 extending through the pump body 34 as clearly shown in Figs. 1, 5 and 9.

Referring further to the structure of the fluid discharge control valve 51 as illustrated in Figs. 1, 2, 3, and 9, this valve 51 is provided with an outwardly axially disposed circular fluid discharge control rim 65 cast integrally with the wall 53 and the circular peripheral face of the rim 65 is slidably engaged with the valve seat 48ᴰ of the discharge manifold 48ᴮ and axially aligned with the peripheral comparatively narrower face of the wall 52.

The radially outwardly flaring passages 51ᴬ disposed between the axially spaced walls 52 and 53 of the fluid discharge control valve 51 are radially defined by the walls 56 and constitute open exhaust-fluid discharge passages for air, or mixtures of air and oil, or of only oil as these fluids are discharged from the pump discharge ports 41 through the manifold discharge ports 48ᴸ and the valve seat discharge openings.

The valves 50 and 51 which are rigidly connected together by the rods 61 are adapted to be concurrently shifted axially into various operative positions by conjoint control means including three valve shift rods 66 which extend inwardly into a hub 67 cast integrally with the wall 52 of the fluid discharge control valve 51 and are secured at the inner ends to the hub 67 by a snap ring 68. As shown in Figs. 1 and 3, the walls 56 are formed with integral bosses 56ᵃ through which the shift rods 66 extend and which bosses 56ᵃ seal the cylindrical passages for the shift rods from communication with the fluid passages 51ᴬ. The shift rods 66 are slidably supported in the bushings 69 and seals 70 which are carried in the enlarged head 26 of the power-driven shaft 25 and their outer ends are secured to the shifter sleeve 71, as by a snap ring 72.

The shifter sleeve 71 is supported on and rotatable with the power-driven shaft 25 and enclosed within the shifter collar 73 which is carried on a ball-bearing 74 interposed between the shifter collar 73 and the shifter sleeve 71, the collar 73 being retained against axial movement relatively to the shifter sleeve 71 as by a snap ring 75 seated in the outer end of the shifter sleeve 71 against the space ring 76, however, the valve shifter sleeve 71 is axially shiftable to conjointly shift the valves 50 and 51 relatively to the rotatable power-driven shaft 25 and clutch casing by the non-rotatable shifter collar 73 which is provided with diametrically oppositely disposed studs 73ᵃ which are continuously engaged by the forked end 77ᵃ of the valve shifting lever 77 which is pivotally supported on the pivot rod 78 suitably supported on a stationary support not shown.

The power-driven shaft 25 is shown in Fig. 1 with an outwardly extended end provided with a keyway 25ᵃ for rigid securement thereto of any suitable drive pulley or sprocket.

It will now be apparent that the intake control valve 50 is provided with a plurality of radially outwardly flaring air inlet passages 50ᴬ which extend outwardly from the valve central openings 54 within the air zone and merge into the circular peripheral space between the spaced walls 52 and 53 within the zone of the oil annulus. The discharge control valve 51 is provided with a plurality of radially disposed open discharge passages 51ᴬ which extend from their common circular intake space disposed between the peripheral portions of the walls 52 and 53 within the zone of the oil annulus and converge radially inwardly to their common discharge openings 54 in the central portion of the valve within the air zone which is, for illustrative purposes, defined by the lines X in Figs. 1, 8 and 9.

Without giving consideration to the metering control of the fluids by the concurrent action of the valves 50 and 51, the fluid flow circuit may best be described as follows:

Assuming that the direction of rotation of the clutch casing is clockwise as viewed in Figs. 2, 3, 4, 5 and 8, all fluids, such as only air admitted into the inlet passages 50ᴬ of the intake control valve 50, or mixtures of air with oil admitted through the oil inlet openings 57ᶜ, or only oil admitted through the oil inlet openings 57ᶜ, pass through and from the peripheral control rim of valve 50 through the valve seat intake openings 48ᴷ directly into the pressure-stabilizing port 48ᴴ of the suction manifold 48ᴬ, thence into the manifold intake ports 48ᴶ, thence through the pump intake ports 40 into the chambers of the pump disposed between the planet gears and the sun gear, thence around the planet gears 39 within the gear cavities 38 and around the sun gear 36 within its cavity 35 and therefrom into the discharge ports 41.

From the pump discharge ports 41, the fluids pass into the manifold discharge ports 48ᴸ and thence into the discharge manifold pressure-stabilizing port 48ᴴ and through the valve seat openings whereat the discharge of the air, or mixtures of air and oil, or only oil, or neither is controlled by the peripheral rim of valve 51; the air, or mixtures of air and oil, or only oil being adapted to pass from the valve seat openings in the discharge manifold 48ᴮ through the valve discharge passages 51ᴬ and central openings 54 into the clutch casing.

As shown in Fig. 1, the valves 50 and 51 are in neutral position and, with the clutch casing rotating in clockwise direction as heretofore assumed, only air from the central air zone is being admitted into the radial inlet passages 50ᴬ which, under the suction created within the gear pump, passes through the valve seat intake openings 48ᴷ for circulation through the intake manifold 48ᴬ and through the pump, as described hereinabove, and thence through the discharge ports 48ᴸ of manifold 48ᴮ and through its valve seat openings into and through the discharge passages 51ᴬ and through the outlet openings 54 of the discharge control valve 51 into the central air zone.

Although the peripheral flow control rim of the intake control valve 50 is constantly within the oil annulus during the rotation of the clutch casing so that the oil is free to pass through the circularly spaced openings 57ᶜ therein, the oil, during such neutral operation, is sealed from passing into the valve seat intake openings 48ᴷ by the narrow circular sealing face of wall 53 which separates the circular oil inlet channel 57ᵃ from the peripheral annular air discharge channel between the walls 52 and 53 into which merge all three radial passages 50ᴬ. Under such neutral operation the driven shaft 32 for all practical purposes is unoperative or in stationary position.

The fluid metering and speed controlling operation of the valves 50 and 51 will readily be understood by reference to Fig. 1.

A progressive movement of the operating lever 77 toward the right will cause a progressive and simultaneous movement of both valves 50 and 51 toward the left and during such valve movement the flow of the fluids into, through and out of the power-transmitting pump will cause a progressively decreased flow of air into the pump while a progressively increased flow of oil will be admitted for admixture with the air until only oil is being admitted into the pump through the valve seat intake openings 48ᴷ thus interposing between the pump gears a mixture of fluids or finally only oil of progressively increased resistant value to thereby impart a progressively increased torque and speed to the driven shaft 32.

The manner in which the peripheral rim of the intake valve 50 causes a progressively increased flow of oil into a admixture with the simultaneously progressively decreased flow of air into the power transmitting pump to increase the torque and speed of the driven shaft 32 will be readily understood by referring to Fig. 1 and visualizing the progressive movement of the peripheral rim of valve 50 toward the left and particularly the successive positions of the narrow circular rim face of the valve wall 53 relatively to the intake openings 48ᴷ. As this valve wall 53 moves progressively toward the left, progressively increased areas of the open valve seat intake openings 48ᴷ will be exposed to open communication with the oil flowing through the circularly spaced oil inlet openings 57ᶜ into the channel 57ᵃ and thence into the valve seat openings 48ᴷ while simultaneously the areas of the valve seat openings 48ᴷ which are in open communication with the radial air inlet passages 50ᴬ are progressively decreased.

While the torque and speed of the driven shaft 32, are progressively increased by the above described progressively increasing resistant value of the fluid passing into the pump, the torque and speed increase is further enhanced by the concurrent movement of the flow discharge control valve 51 simultaneously progressively closing the valve seat openings in the discharge manifold 48ᴮ.

When the peripheral rim of wall 53 of the intake valve 50 has moved past the valve seat intake openings 48ᴷ, the air outlet channel between the peripheral portions of walls 52 and 53 will then be closed by the outer portion of the valve seat 48ᴰ so that no air but only oil can pass into the valve seat openings 48ᴷ, however, at this position of the valve 50, the discharge control valve 51 will have moved toward the left a sufficient distance whereat its rim 65 has completely closed all of the discharge openings in the valve seat for the discharge valve 51 thus fully arresting the flow of oil from the pump and thereby causing the driven shaft to rotate in substantially one to one ratio with the driving shaft.

Phase adjustment of control valves 50 and 51 is illustrated in Fig. 9 wherein the bosses 62ᴬ are comparatively shorter than the bosses 62 shown in Fig. 1 thereby advancing the initial position of the discharge control valve 51 a predetermined distance inwardly or closer toward the intake control valve 50, which is shown in Fig. 9 in the same position as in Fig. 1, thus in such advanced initial position, without any disadvantage, slightly restricting the discharged flow of air during neutral operation of the clutch to thereby shorten the period of neutral operation in order to attain quicker increase in torque and speed of the driven shaft 32 within the same length of concurrent movement of the control valves 50 and 51. Obviously, the intake control valve 50 moves the same distance when the discharge control valve 51 is adjusted as shown in Fig. 9 that it does in the valve arrangement shown in Fig. 1 to provide identical metering of fluids.

I claim:

1. A variable speed hydraulic coupling adapted to be interposed between rotatable power-driven means and a driven shaft and comprising a rotatable casing having therein a pair of axially spaced intercommunicating chambers partially filled with oil whereby, during the rotation of said casing, there is provided in said chambers an outer annular zone of oil and an inner central zone of air; a cylindrical fluid-intake valve seat and a separate cylindrical fluid-discharge valve seat, said valve seats being axially spaced from each other and both being disposed in said zone of oil; fluid-circulating power-transmitting means positioned axially between said valve seats including ports providing fluid circuits having intake openings in said intake valve seat and discharge openings in said discharge valve seat and including relatively movable coacting power-transmitting elements operatively connecting said casing with said driven shaft; a cylindrical fluid-intake control valve having a peripheral fluid-metering rim disposed within the zone of oil and being movably mounted on said intake valve seat and having a plurality of radially disposed air passages provided with air inlet openings in the central portion of said intake valve within the zone of air and air discharge openings within said rim, said intake control valve being adapted to control and meter the flow of air or oil or mixtures of air and oil into said port circuits; a cylindrical fluid-discharge control valve spaced axially from said fluid-intake control valve and having a peripheral rim disposed within the zone of oil, movably mounted on said discharge valve seat, adapted to control and meter the flow of fluids out of said port circuits, said discharge valve including a plurality of radially disposed exhaust fluid passages having fluid inlet openings in said rim thereof and fluid discharge openings in the central portion of said discharge valve within the zone of air; and conjoint control means for moving said valves to control the fluid flow through said port circuits.

2. A variable speed hydraulic coupling as set forth in claim 1 wherein said fluid-intake valve seat is provided with an annular fluid-intake pressure-stabilizing port communicating with, and interposed between, said intake-valve-seat openings and the intake ends of the ports of said circuits, and wherein said discharge valve seat is provided with an annular exhaust fluid pressure-stabilizing port communicating with, and interposed between, said discharge-valve-seat discharge openings and the discharge ends of the ports of said circuits, and wherein the fluid metering rim of said intake control valve is adapted to control and meter the flow of the mixtures of air and oil in relatively varied proportions into said intake-valve-seat intake openings, and wherein the fluid metering rim of said discharge control valve is provided with a rim extension which is adapted to completely arrest the discharge of fluid from said discharge-valve-seat discharge openings, and wherein said conjoint control means for said valves is adapted to move said valves concurrently axially on said valve seats.

3. A variable speed hydraulic coupling as set forth in claim 2 wherein said discharge-valve-seat discharge openings consist of a plurality of circularly spaced openings of at least two different diameters all having edges aligned in a common plane extending transversely to the axis of the clutch.

4. In a variable power and speed transmitting hydraulic clutch including a rotatable casing, fluid-circulating power-transmitting pumping means operatively connected with a driven shaft extending iinto said casing, said pumping means being disposed axially intermediate opposed ends of said casing thereby dividing the interior of said casing into a pair of axially spaced fluid chambers, and having fluid intake and discharge manifolds at opposite ends thereof provided respectively with intake and discharge ports communicating with said pumping means and with said axially spaced chambers, a cylindrical valve seat on each of said manifolds, said valve seats having openings communicating respectively with said intake and discharge ports, said casing being partially filled with oil whereby, during its rotation, there is provided in said chambers an outer annular zone of oil and an inner central zone of air, a cylindrical fluid intake control valve movably mounted on the intake manifold valve seat including means on said intake control valve adapted to control and meter the flow of only air, or mixtures of relatively varied proportions of air and oil, or only oil through, and responsively to its movement relatively to, the intake valve seat openings, a cylindrical fluid discharge control valve movably mounted on the discharge manifold valve seat including means on said discharge control valve adapted to control and meter the fluid flow through, and responsively to its movement relatively to, the discharge valve seat openings, and conjoint control means for said valves arranged to move said valves concurrently on said manifold valve seats.

5. In a variable power and speed transmitting hydraulic clutch as set forth in claim 4 wherein said intake control valve comprises a pair of parallel axially spaced circular walls of like diameters, and wherein said means on said intake control valve adapted to control and meter the flow of said fluids comprises an air passage disposed between said parallel axially spaced circular walls provided with air inlet openings in the centers of said walls within the zone of air and an air discharge opening between the peripheries of said walls, and including at least one opening within the oil annulus extending transversely through said walls and through said air passage and sealed from communication with said air passage for permitting flow of oil in the chamber containing said intake control valve between opposite ends of said intake control valve.

6. In a variable power and speed transmitting hydraulic clutch as set forth in claim 4 and wherein said discharge control valve comprises a pair of parallel axially spaced circular walls of like diameters, and wherein said means on said discharge control valve adapted to control and meter the flow of fluids comprises a fluid discharge passage disposed between said parallel axially spaced circular walls provided with an annular fluid inlet opening between the peripheries of said walls and fluid discharge openings within the centers of said walls, and including a plurality of openings within the oil annulus extending transversely through said parallel walls and through said fluid discharge passage and sealed from communication with said fluid discharge passage for permitting flow of oil in the chamber containing said discharge control valve between opposite ends of said discharge control valve.

JOHN R. THOMAS.

REFERENCES CITED

The following references are of record in the file of this patent:

UNITED STATES PATENTS

| Number | Name | Date |
|---|---|---|
| Re. 22,577 | Thomas | Dec. 12, 1944 |
| 471,656 | Strong | Mar. 29, 1892 |